(12) United States Patent  (10) Patent No.: US 6,631,127 B1
Ahmed et al.  (45) Date of Patent: Oct. 7, 2003

(54) APPARATUS AND METHOD FOR DYNAMICALLY SELECTING AN ARQ METHOD

(75) Inventors: Mansoor Ahmed, Ft. Worth, TX (US); Kamyar Rohani, Keller, TX (US); Kevin M. Laird, Keller, TX (US)

(73) Assignee: Motorola, Inc,, Schaumburg, IL (US)

( * ) Notice: Subject to any disclaimer, the term of this patent is extended or adjusted under 35 U.S.C. 154(b) by 0 days.

(21) Appl. No.: 10/157,619

(22) Filed: May 29, 2002

(51) Int. Cl.$^7$ .................................................. H04J 3/24
(52) U.S. Cl. ....................... 370/349; 370/332; 370/230; 714/701; 455/69; 455/67.1
(58) Field of Search ................................ 370/229, 230, 370/317, 333, 332, 349; 714/747, 748, 749, 750, 751; 455/69, 67.1–67.7

(56) References Cited

U.S. PATENT DOCUMENTS

| | | | |
|---|---|---|---|
| 5,229,767 A | * | 7/1993 | Winter et al. .................. 341/50 |
| 5,822,315 A | * | 10/1998 | de Seze et al. ............. 370/337 |
| 6,247,150 B1 | * | 6/2001 | Niemela ...................... 714/701 |
| 6,308,294 B1 | * | 10/2001 | Ghosh et al. ............... 714/751 |
| 6,456,605 B1 | * | 9/2002 | Laakso et al. ............... 370/330 |
| 2001/0034209 A1 | * | 10/2001 | Tong et al. ................... 455/69 |
| 2002/0080719 A1 | * | 6/2002 | Parkvall et al. ............. 370/235 |
| 2003/0081576 A1 | * | 5/2003 | Kim et al. .................. 370/335 |
| 2003/0095532 A1 | * | 5/2003 | Kim et al. .................. 370/342 |
| 2003/0118031 A1 | * | 6/2003 | Classon et al. ........ 370/395.54 |

OTHER PUBLICATIONS

Martins and Alves, "ARQ Protocols with Adaptive Block Size Perform Better Over a Wide Range of Bit Error Rates", Jun. 6, 1990, IEEE Transactions on Communications, vol. 38, No. 6, pp. 737–739.*

* cited by examiner

Primary Examiner—Alpus H. Hsu
Assistant Examiner—Michael J Molinari
(74) Attorney, Agent, or Firm—Lalita P. Williams

(57) ABSTRACT

A method 600 of selecting an ARQ method for retransmitting a data frame based on an accumulated signal to noise ratio (SNR) of systematic bits in the data frame at a receiving unit 508. The sending unit 500 tracks the accumulated SNR of systematic bits by using channel SNR measurement reports sent by the receiving unit 508. The method utilizes Chase combining of re-transmitted systematic bits (via Partial incremental redundancy transmissions) until the accumulated SNR of the systematic bits has reached a suitable value, and then switches to sending only parity bits (via Full incremental redundancy) in retransmissions. In addition, the method alters the allocation of resources, such as code power, to provide only that necessary for successful decoding of the transmitted frame. The sending unit 500 informs the receiving unit 508 of the type of transmission, number of the transmission and/or resource allocation associated with the data frame.

10 Claims, 3 Drawing Sheets

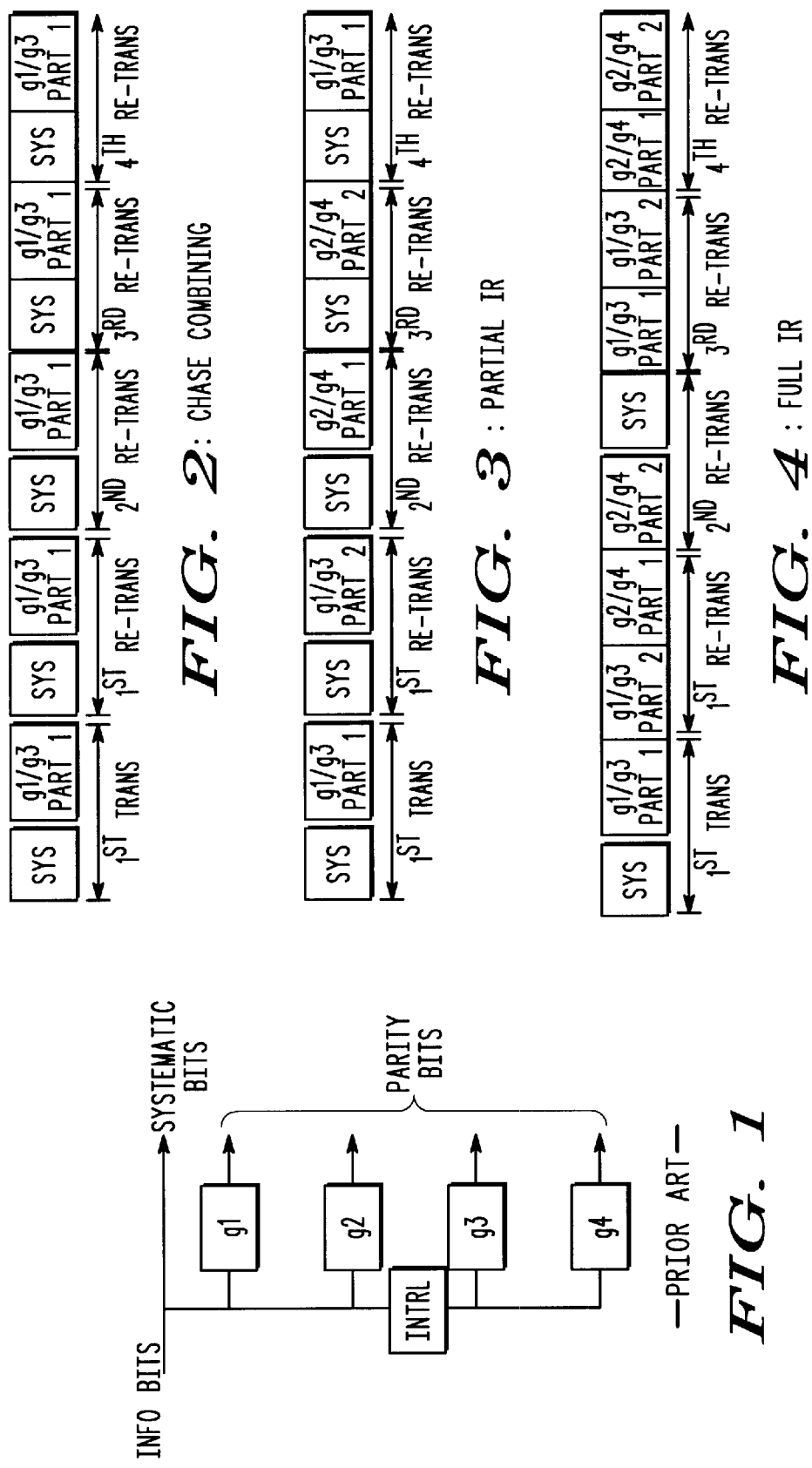

APPARATUS AND METHOD FOR DYNAMICALLY SELECTING AN ARQ METHOD

FIELD OF THE INVENTION

The present invention relates generally to communication systems and in particular to dynamically selecting an automatic repeat request method for the retransmission of a data frame.

BACKGROUND OF THE INVENTION

In a Hybrid Automatic Repeat Request (H-ARQ) system, retransmissions of data frames are used to obtain a desired level of data quality at the receiving end of a communication system. However, excessive retransmissions can lead to a reduction in system throughput. In systems that employ Adaptive Modulation and Coding (AMC), the selection of AMC is based on channel conditions at the time the selection is made. Taking into account measurement error, feedback delay, and mobile station velocity, the AMC selection based on then current channel conditions is often not the best choice at the time that the data frame is transmitted. The system then relies on ARQ methods to correct situations where the AMC was poorly chosen. To reduce ARQ throughput loss, an adaptive ARQ system is necessary to adjust the ARQ method to best match actual channel conditions.

Three methods of H-ARQ will now be described using a channel encoder with a rate of one fifth (i.e., for every bit input into the encoder, five bits are produced) for illustration, as shown in FIG. 1. FIGS. 2–4 depict the over the air slot format of data from the encoder operating at a rate of ½ coding of the initial transmission. Referring to FIGS. 2 and 3, H-ARQ utilizing a repeat and max ratio combine (Chase) technique is shown. Chase combining (as discussed herein) is based on an IEEE paper: D. Chase, "Code Combining—A Maximum-Likelihood Decoding Approach for Combining an Arbitrary Number of Noisy Packets," IEEE Trans on Communications, Vol. 33, pp. 385–393, May 1985. The basic idea is to retransmit data packets that are not received (i.e., not decoded properly). The retransmitted packets are weighted by their corresponding signal amplitude-to-noise power ratios and are added to the originally transmitted packets—in other words, they are max ratio combined (MRC). Adding the retransmitted packets to the originally transmitted packets improves the signal-to-noise ratio (signal-to-noise ratios are summed due to MRC). Thus, packets that are not decoded at the first trial will eventually decode after several repeats, since the SNR continually increases with repeats.

Referring to FIGS. 2 and 3, H-ARQ utilizing the Chase combining technique operates as follows: outputs from the g1 and g3 polynomials are punctured (denoted by part 1) and transmitted along with the systematic bits as shown in FIG. 2. Note that all packet retransmissions are identical to the first packet. Thus, they can be max ratio combined or alternatively they can be decoded without any additional information (i.e., they are self-decodable). Referring to FIGS. 1 and 3, a Partial Incremental Redundancy (IR) combining technique is illustrated. For this case, the first transmitted packet is identical to that shown in FIG. 3. However, the first re-transmission includes the second half of the g1/g3 punctured parity bits (denoted as part 2) that were not transmitted with the first packet. Max ratio combining can be exploited on the systematic bits. The partial IR method provides a higher coding gain, especially in fast fading channels, for example, in vehicular channels for which perfect signal-to-noise (SNR) tracking is impossible. Also, it should be noted that this scheme is self-decodable as in FIG. 2. Referring to FIGS. 1 and 4, a Full IR combining technique is illustrated. For this case, the first re-transmission does not repeat the systematic bits. Instead, parity bits are continuously sent in each next transmission. This process then repeats. The full IR method provides a higher IR gain relative to the partial IR method, but re-transmitted packets are not self-decodable (except when the systematic bits are again transmitted).

When the AMC system tracks properly, as in the case of a slow moving mobile station, there are many instances when only a small SNR is required in the first retransmission to correctly receive a given frame of data. This assumes that the two transmissions are combined using Chase combining or Full IR. By providing a small SNR, saved resources such as transmit power and Walsh codes, can be utilized elsewhere to increase system throughput. The Full IR combining scheme provides significant channel coding gain with respect to Chase combining. However, when an initial transmission is received with a degraded SNR and the second transmission is received at or above threshold, Full IR performance degrades relative to Chase combining. In such a case, the Chase combining method works properly. However, the Full IR method requires further retransmissions because the critical systematic bits were lost in the initial transmission. Thus, the second transmission is not 'self-decodable' and relies heavily on information received in the first transmission.

A method for selecting Chase, Partial Chase, and Partial IR combining is known. However, the method does not utilize Full IR, which provides the best performance. Given a combining technique, the prior art method determines how many retransmissions are necessary via the accumulated energy in the user equipment (UE) communicated to the base station in a two bit soft acknowledgment. Thus, the prior art method has the disadvantages of loss in throughput relative to full IR and the expense of extra ACK/NACK bits transferred in the uplink. In addition, the prior art does not provide a method of selecting between ARQ combining methods based on the SNR of the communication channel at the UE.

Thus, there is a need for an improved method of dynamically selecting the best H-ARQ method for transmitting data frames.

BRIEF DESCRIPTION OF THE DRAWINGS

FIG. 1 is an illustration of a known channel encoder operating at a rate of one fifth.

FIG. 2 is an illustration of the over the air slot format of data from the encoder of FIG. 1 combined using the Chase H-ARQ method.

FIG. 3 is an illustration of the over the air slot format of data from the encoder of FIG. 1 combined using the Partial IR H-ARQ method.

FIG. 4 is an illustration of the over the air slot format of data from the encoder of FIG. 1 combined using the Full IR H-ARQ method.

DETAILED DESCRIPTION OF THE PRESENTLY PREFERRED EMBODIMENT

Figure 5:
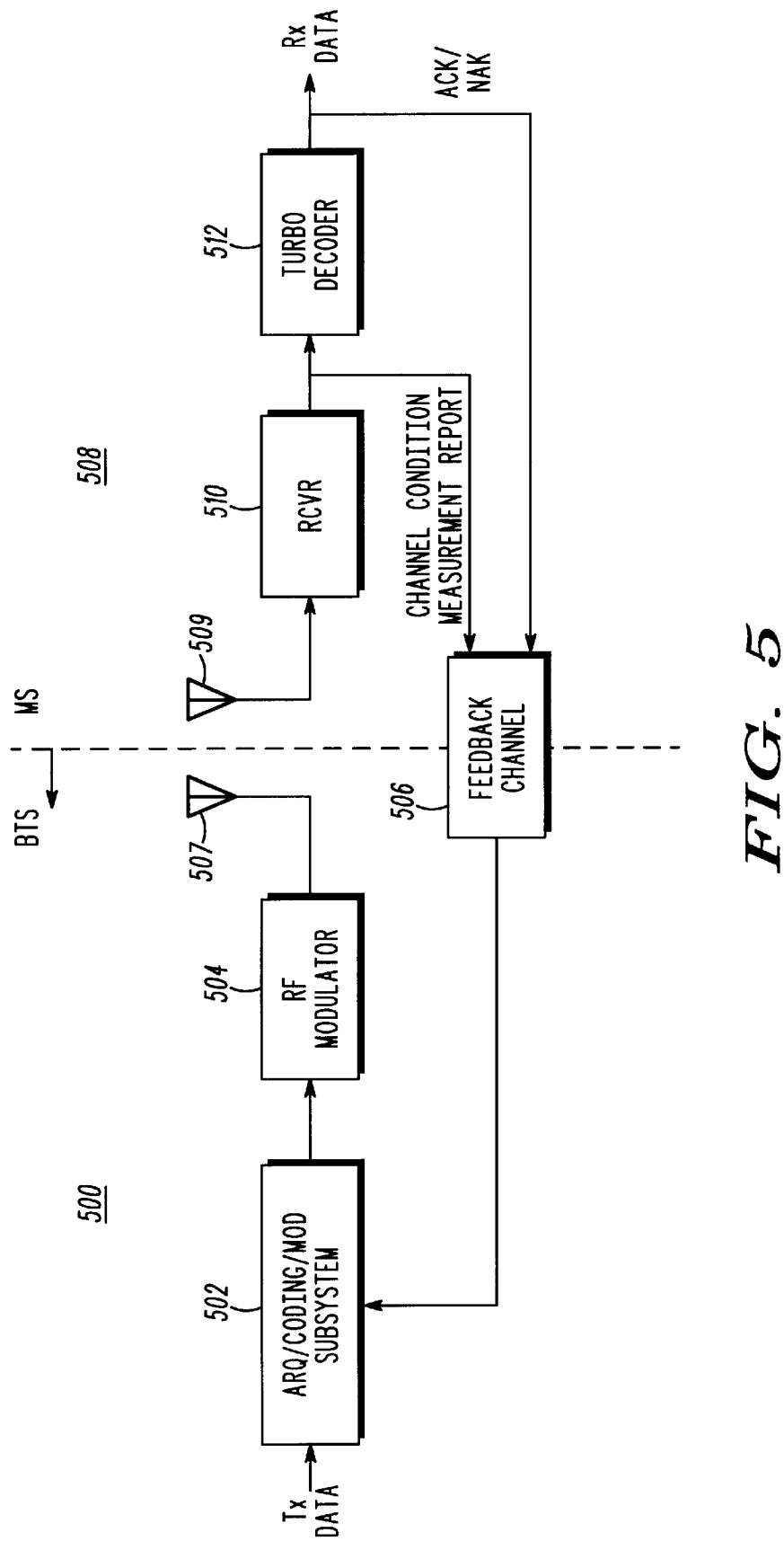
FIG. 5 is a block diagram of pertinent portions of a base station transceiver and mobile station that can implement the preferred embodiment of the method of the present invention.

Referring to FIG. 5, relevant portions of a Base Station Transceiver (BTS) 500 and User Equipment 508 that can implement the method of the present invention are shown. In the preferred embodiment, the User Equipment 508 is a mobile station. However, one of ordinary skill in the art will recognize that the invention may be used with many types of user equipment. As shown, the BTS 500 includes an ARQ/Coding/Modulation subsystem 502. This subsystem 502 implements the H-ARQ selection method of the present invention and determines the Coding and Modulation schemes applied to data transmitted to the MS 508. In systems that employ Adaptive Modulation and Coding (AMC), such as Third Generation Partnership Project (3GPP) High Speed Downlink Packet Access (HSDPA) and 3.5G, the selection of the AMC is based on channel condition measurement reports provided by the MS 508 through a feedback channel 506. Data from the ARQ/Coding/Modulation subsystem 502 is modulated by an RF Modulator 504. The modulated data signal is transmitted via antenna 507 and received by the MS 508 via antenna 509. The MS receiver 510 demodulates the signal and sends soft bits to the turbo decoder 512 for processing. The turbo decoder 512 recovers the data transmitted by the BTS 500. When the turbo decoder successfully decodes the received bits, it sends an Acknowledge (ACK) to the ARQ/Coding/Modulation subsystem 502 of the BTS 500 via the feedback channel 506. When the turbo decoder 512 is unable to decode the received bits because the data frame was received with errors, as indicated by a cyclic redundancy check (CRC), it sends a No Acknowledge (NACK) to the ARQ/Coding/Modulation subsystem 502. The BTS 500 uses the NACK and the channel condition measurement reports to select the best H-ARQ method to use for retransmitting the data frame. In the preferred embodiment of the present invention, a stop-and-wait H-ARQ scheme is employed. In other words, the BTS 500 transmits a first frame of data and waits for an ACK or NACK from the MS 508 before transmitting the next frame of data.

In the preferred embodiment of the present invention, the shortcomings of the Full IR method are mitigated by selectively choosing the H-ARQ method for re-transmitting a data frame based on accumulated SNR of the systematic bits of the data frame in the MS receiver 510. The ARQ/Coding/Modulation subsystem 502 of the BTS 500 tracks this value using the channel SNR measurements received from the MS 508. Typically, the MS 508 transmits a SNR measurement report to the BTS 500 every two milliseconds. In the preferred embodiment, the method utilizes Chase combining of retransmitted systematic bits (via Partial IR transmissions) until the accumulated SNR of the systematic bits has reached a suitable value, and then switches to sending only parity bits in subsequent transmissions.

The following steps are taken to achieve successful transfer of a data frame to the MS 508. First, an AMC selection is made based on channel quality reports from the MS 508. Next, the BTS 502 transmits a data frame to the MS 508. The MS 508 responds with an ACK/NACK message to indicate the status of the transmission, and sends a channel SNR measurement report corresponding to the transmitted data frame. (The MS 508 continuously sends channel SNR measurement reports to the BTS 500, typically every two milliseconds.) Based on the report, the BTS 500 updates a local estimate of the accumulated SNR as seen at the MS 508. In the case of a NACK, the BTS 500 also selects a retransmission method based in part on the local estimate and in part on the latest channel SNR report from the MS 508. In the preferred embodiment, the retransmission method is chosen from Partial IR and Full IR H-ARQ methods. Alternatively or additionally, the resource allocation (Walsh codes and code power) can be altered to provide only the necessary requirement to allow a successful decoding of the transmission. The ability to alter resource allocation is useful when the original transmission is very near threshold. The retransmission procedure is continued until the data frame is successfully received or the limit on retransmissions is reached. The method provides an H-ARQ system that performs well under adverse conditions such as poor AMC tracking due to delay and vehicular speed. The method also mitigates the self-decodability issue with Full IR H-ARQ.

Figure 6:
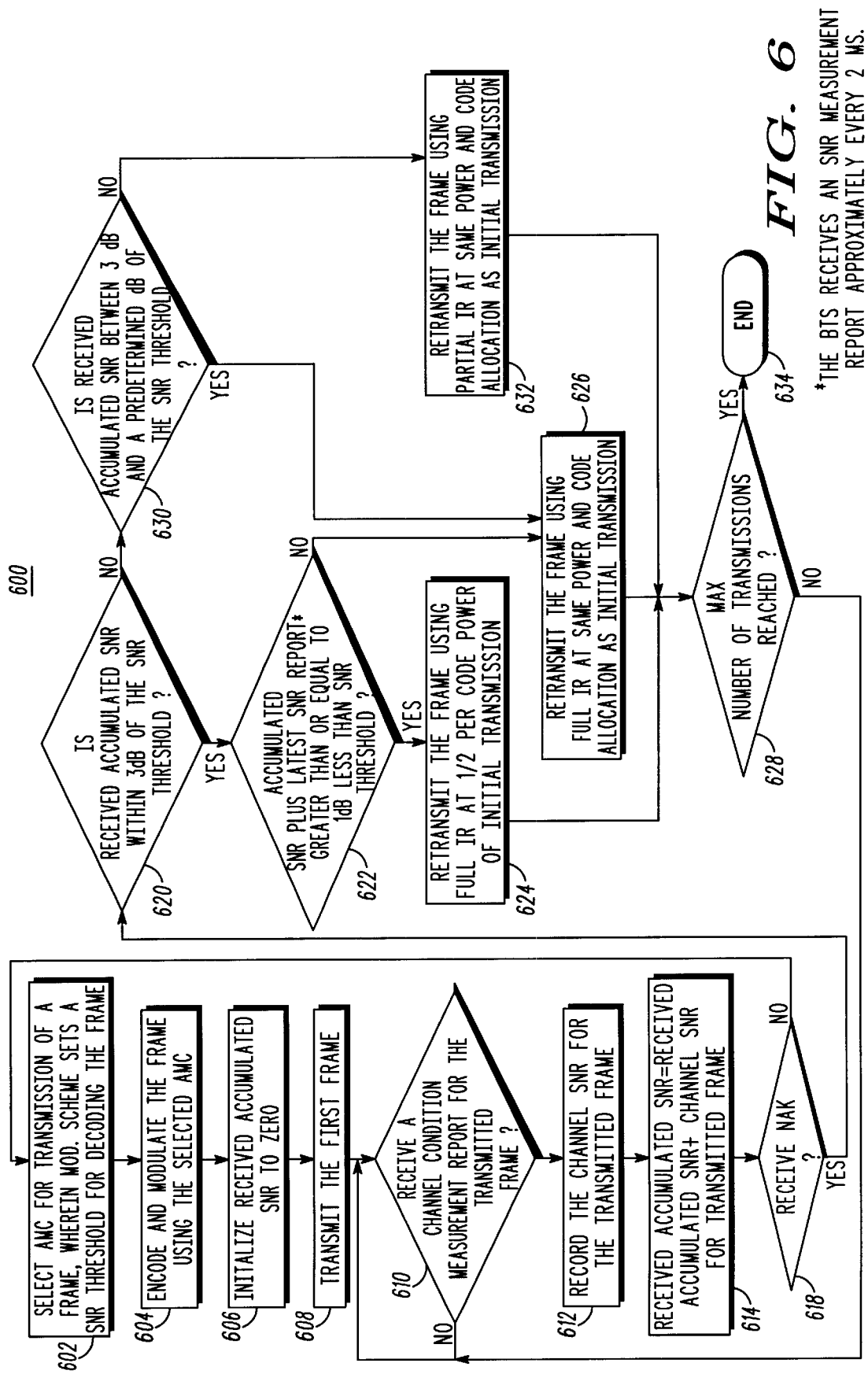
FIG. 6 is a flow diagram of the preferred embodiment of the method of the present invention.

Referring to FIG. 6, a flow diagram of the preferred embodiment of the method of the present invention is shown. The method 600 runs in the ARQ/Coding/Mod subsystem 502 of the BTS 500 of FIG. 5 on any computer or microprocessor commonly known in the art. At step 602, the method selects the AMC for transmission of a data frame to the MS 508. The selection is based on channel condition measurement reports received from the MS 508 through the feedback channel 506. The AMC sets an SNR threshold required to successfully decode the frame. At step 604, the data frame is encoded and modulated using the selected AMC. At step 606, the method initializes variable "received accumulated SNR" to zero. This variable is used to maintain an estimate of the accumulated SNR for the systematic bits as seen at the MS 508. At step 608, the method transmits the data frame. At step 610, the method determines whether the BTS 500 has received a channel condition measurement report for the transmitted frame from the MS 508. If the answer is no, the method continues to poll for receipt of a measurement report. When a measurement report is received, the method records the channel SNR for the transmitted frame (step 612). At step 614, the method updates the received accumulated SNR using the channel SNR recorded at step 612.

At step 618, the method determines whether a NACK was received from the MS 508 for the transmitted frame. If the answer is yes, the method determines the best H-ARQ method to use for the retransmission. In particular, at step 620, the method determines whether the received accumulated SNR is within 3 dB of the SNR threshold (set at step 602). If the answer is yes, the method determines whether the latest SNR (determined from the latest channel condition measurement report received from the MS 508) is greater than or equal to 1 dB less than the SNR threshold (step 622). It should be noted that in one embodiment, the BTS 500 constantly receives reports from the MS 508 (approximately ever 2 ms) and tracks the latest SNR report. In an alternate embodiment, the MS 508 reports SNR when it reports the NACK to the BTS 500. If the answer at step 622 is yes, the method retransmits the frame using the Full IR H-ARQ method at one half the per code power of the initial transmission (step 624). At step 624, the method allows a reduction in the allocated resources because the first transmission was received at the MS 508 very near the required threshold. In such a case, a retransmission at full power is not required to reach the required threshold. Instead, the additional power can be allocated to another user. Next, at step 628, the method determines whether the maximum number of retransmissions has been reached. If the answer is no, the method proceeds to step 610 and continues processing. If the answer is yes, the method ends at step 634.

Referring back to step 622, if the latest SNR is not greater than or equal to 1 dB less than the SNR threshold, the method retransmits the frame using the Full IR H-ARQ method at the same power and code allocation as the initial transmission (step 626). Then, at step 628, the method determines whether the maximum number of retransmissions has been reached. If the answer is no, the method proceeds to step 610 and continues processing. If the answer is yes, the method ends at step 634.

Referring back to step 620, if the accumulated SNR is not within 3 dB of the SNR threshold, the method determines whether the received accumulated SNR is between 3 dB and a predetermined dB of the SNR threshold (step 630). For example, for QPSK modulation, the predetermined dB is 7 dB; for 16 QAM modulation (rate ¾ turbo code), the predetermined dB is 4 dB. If the received accumulated SNR is between 3 dB and a predetermined dB of the SNR threshold, the method retransmits the frame using the Full IR H-ARQ method at the same power and code allocation as the initial transmission (step 626). Then, at step 628, the method determines whether the maximum number of retransmissions has been reached. If the answer is no, the method proceeds to step 610 and continues processing. If the answer is yes, the method ends at step 634.

Referring back to step 630, if the received accumulated SNR is not between 3 dB and a predetermined dB of the SNR threshold, the method retransmits the frame using the Partial IR H-ARQ method at the same power and code allocation as the initial transmission (step 632). Next, at step 628, the method determines whether the maximum number of retransmissions has been reached. If the answer is no, the method proceeds to step 610 and continues processing. If the answer is yes, the method ends at step 634.

Referring back to step 618, if a NACK is not received (i.e., the frame was transmitted successfully), the method proceeds to step 602 to repeat the process for the next frame. The method is performed until all data frames transmitted by the BTS 500 are successfully received and decoded by the MS 508 or until the maximum number of retransmissions have been reached. In order for the MS 508 to decode frames received from the BTS 500, the MS 508 must know the type of transmission/retransmission (e.g. Full IR, Partial IR) that the BTS 500 is sending. In the preferred embodiment of the present invention, the BTS 500 signals the MS 508 with this information via an IR version number represented by one to three bits. The IR version number could comprise two bits including the type of transmission (e.g. Full IR, Partial IR) and the transmission number (e.g. first transmission, first retransmission, etc.). For example, referring to FIG. 4, when the MS 508 receives an IR version number including Full IR, first retransmission, the MS 508 knows that it should decode a frame including systematic bits (Sys) and the first half of the g1/g3 punctured parity bits. Alternatively, the IR version number could comprise three bits including the power allocation. Using the previous example, the IR version number could include the type of transmission, the transmission number and the power allocation such as Full IR, first retransmission and one half power.

In this case, the MS 508 knows that it should decode a frame including systematic bits and the first half of the g1/g3 punctured parity bits at half the per code power of the initial transmission.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of selecting an automatic repeat request method for transmitting a data frame, the method comprising:

determining a signal to noise ratio threshold required to successfully decode the frame;

initially transmitting the frame;

receiving a channel signal to noise ratio measurement report corresponding to the initially transmitted frame;

using the measurement report to update a received accumulated signal to noise ratio value, wherein the value represents an estimate of received accumulated signal to noise ratio for systematic bits in the initially transmitted frame;

determining whether the initial transmission failed;

when the initial transmission fails, comparing the accumulated signal to noise ratio value to the signal to noise ratio threshold; and based on the comparison, selecting one automatic repeat request method among a plurality of automatic repeat request methods to use in retransmitting the frame.

2. The method of claim 1 wherein the step of selecting the automatic repeat request method comprises the steps of:

determining whether the accumulated signal to noise ratio value is within a first predetermined value of the signal to noise ratio threshold;

when the accumulated signal to noise ratio value is within the first predetermined value of the signal to noise ratio threshold, determining whether a signal to noise ratio in a most recent signal to noise ratio measurement report is within a predetermined range of the signal to noise ratio threshold; and when the signal to noise ratio in the most recent signal to noise ratio measurement report is within the predetermined range, selecting to retransmit the frame using a Full Incremental Redundancy automatic repeat request method at half power of the initial transmission.

3. The method of claim 2 wherein when the signal to noise ratio in the most recent signal to noise ratio measurement report is not within the predetermined range, the method comprises the step of selecting to retransmit the frame using a Full Incremental Redundancy automatic repeat request method at a same power of the initial transmission.

4. The method of claim 2 wherein when the accumulated signal to noise ratio value is not within the first predetermined value of the signal to noise ratio threshold, the method comprises the steps of:

determining whether the accumulated signal to noise ratio value is between the first predetermined value and a second predetermined value of the signal to noise ratio threshold; and when the accumulated signal to noise ratio value is between the first predetermined value and a second predetermined value, selecting to retransmit the frame using a Full Incremental Redundancy automatic repeat request method at a same power as the initial transmission.

5. The method of claim 4 wherein when the accumulated signal to noise ratio value is not between the first predetermined value and the second predetermined value, the method comprises the step of selecting to retransmit the frame using a Partial Incremental Redundancy automatic repeat request method at a same power as the initial transmission.

6. The method of claim 1 wherein the step of determining a signal to noise ratio threshold required to successfully decode the frame comprises the step of selecting an amplitude modulation and coding scheme for transmission of the frame, the amplitude modulation and coding scheme setting the signal to noise ratio threshold required to successfully decode the frame.

7. The method of claim 1 wherein after the step of receiving a channel signal to noise ratio measurement report corresponding to the initially transmitted frame, the method comprises the step of storing the channel signal to noise ratio measurement report.

8. The method of claim 1 wherein the step of initially transmitting the frame comprises the steps of:

transmitting the frame; and transmitting a version number corresponding to the frame.

9. The method of claim 8 wherein the step of transmitting a version number corresponding to the frame comprises transmitting a version number comprising at least one of a transmission type, a transmission number and a power allocation.

10. A storage medium having stored thereon a set of instructions which, when loaded into a processing unit, causes the unit to perform the following steps:

determining a signal to noise ratio threshold required to successfully decode the frame;

initially transmitting the frame;

receiving a channel signal to noise ratio measurement report corresponding to the initially transmitted frame;

using the measurement report to update a received accumulated signal to noise ratio value, wherein the value represents an estimate of received accumulated signal to noise ratio for systematic bits in the initially transmitted frame;

determining whether the initial transmission failed;

when the initial transmission fails, comparing the accumulated signal to noise ratio value to the signal to noise ratio threshold; and based on the comparison, selecting one automatic repeat request method among a plurality of automatic repeat request methods to use in retransmitting the frame.

\* \* \* \* \*